US009575376B2

United States Patent
Liu et al.

(10) Patent No.: US 9,575,376 B2
(45) Date of Patent: Feb. 21, 2017

(54) RGBW TFT LCD HAVING REDUCE HORIZONTAL CROSSTALK

(71) Applicant: Century Technology (Shenzhen) Corporation Limited, Shenzhen (CN)

(72) Inventors: Chih-Chung Liu, New Taipei (TW); Ming-Tsung Wang, New Taipei (TW); Li-Fang Wang, Shenzhen (CN); Jian-Xin Liu, Shenzhen (CN)

(73) Assignee: Century Technology (Shenzhen) Corporation Limited, Shenzhen (CN)

( * ) Notice: Subject to any disclaimer, the term of this patent is extended or adjusted under 35 U.S.C. 154(b) by 129 days.

(21) Appl. No.: 14/692,514

(22) Filed: Apr. 21, 2015

(65) Prior Publication Data

US 2016/0299391 A1    Oct. 13, 2016

(30) Foreign Application Priority Data

Apr. 13, 2015    (CN) .......................... 2015 1 0171603

(51) Int. Cl.
*G02F 1/136*    (2006.01)
*G02F 1/1343*    (2006.01)
*G02F 1/1362*    (2006.01)
*G02F 1/1335*    (2006.01)

(52) U.S. Cl.
CPC ....... *G02F 1/134336* (2013.01); *G02F 1/1336* (2013.01); *G02F 1/13624* (2013.01); *G02F 1/133514* (2013.01); *G02F 1/136286* (2013.01)

(58) Field of Classification Search
CPC .................... G02F 1/134336; G02F 1/136286; G02F 1/1336
USPC ........................................... 349/43
See application file for complete search history.

(56) References Cited

U.S. PATENT DOCUMENTS

2005/0275610 A1*    12/2005    Roh .................... G09G 3/3614
345/88

\* cited by examiner

*Primary Examiner* — Lucy Chien
(74) *Attorney, Agent, or Firm* — Zhigang Ma

(57) ABSTRACT

A TFT array substrate for a TFT LCD includes a plurality of pixels each consisting of a red sub-pixel, a green sub-pixel, a blue sub-pixel and a white sub-pixel arranged in a 2×2 matrix. Two data lines are located between each two neighboring columns of the sub-pixels. A scan line is located between two neighboring rows of the sub-pixels. The sub-pixels are driven by column inversion. The scan lines in electrical connections with different rows of the pixels are turned on successively along a vertical direction. Two neighboring same colored sub-pixels in a same row of the sub-pixels and two neighboring same colored sub-pixel in a same column of the sub-pixels respectively have opposite polarities when the TFT LCD is operated to output a screen having a color the same as the color of the two neighboring same colored sub-pixels.

17 Claims, 5 Drawing Sheets

RGBW TFT LCD HAVING REDUCE HORIZONTAL CROSSTALK

CROSS-REFERENCE TO RELATED APPLICATIONS

This application claims priority to Chinese Patent Application No. 201510171603.2 filed on Apr. 13, 2015, the contents of which are incorporated by reference herein.

FIELD

The subject matter herein generally relates to a TFT LCD (thin film transistor liquid crystal display), and particularly to a TFT LCD having a RGBW (red, green, blue, white) TFT array substrate with a reduced horizontal crosstalk.

BACKGROUND

TFT LCDs have become the most popular flat displays since they have advantages of compactness, low heat generation, long life and visual comfort. In general a TFT LCD includes a backlight module, a first polarizer, a TFT array substrate, a liquid crystal layer, a color filter and a second polarizer. The TFT array substrate forms a plurality of pixels thereon. The liquid crystal layer contains a plurality liquid crystals therein. Originally, each pixel includes three sub-pixels, i.e., a red sub-pixel, a green sub-pixel, and a blue sub-pixel. For such a RGB TFT LCD, the backlight module needs consuming more power in order to have sufficient light passing through the color filter.

To overcome the disadvantage of the RGB TFT LCD, a RGBW TFT LCD is developed, in which each pixel includes a red sub-pixel, a green sub-pixel, a blue sub-pixel, and a white sub-pixel. A transparent area corresponding to the white sub-pixel is defined in the color filter, whereby a light transmittance of the color filter is improved, and the power consumption required by the backlight module can be reduced.

However, for the RGBW TFT LCD, it confronts a problem of horizontal crosstalk which does not occur in the RGB TFT LCD. When the RGBW TFT LCD shows a one-colored segment (for example, an entirely red segment), every pixel in the segment has the same polarity, whereby Vcom couples cannot offset from each other, whereby a horizontal crosstalk happens which results in an uneven grey level beside the red segment. Here Vcom couple means a couple between data lines and an upper common electrode, i.e., CF (color filter) layer Vcom, for providing a bias across the liquid crystals in the liquid crystal layer.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
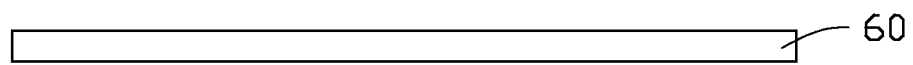
FIG. 1 is cross-sectional view of a RGBW TFT LCD in accordance with the present disclosure.
Figure 1:
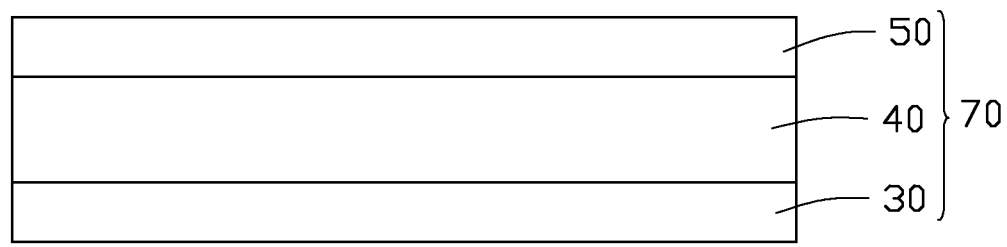
Figure 1:
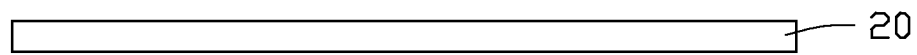
Figure 1:
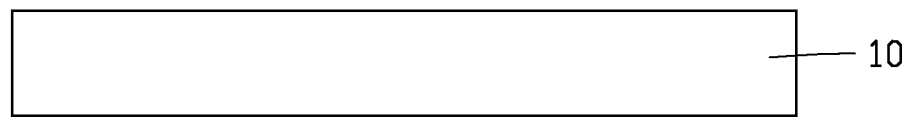

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure is described in relation to a RGBW (red-green-blue-white) TFT (thin film transistor) LCD (liquid crystal display) 1, which can be used in a screen of a mobile phone for example a smart phone, a monitor of a computer, a screen of a laptop, a screen of a television set, or a screen of a tablet computer.

FIG. 1 illustrates a cross-sectional view of the RGBW TFT LCD 1 having, along an upward direction, a backlight module 10, a first polarizer 20, a TFT array substrate 30, a liquid crystal layer 40, a color filter 50 and a second polarizer 60. The TFT array substrate 30, the liquid crystal layer 40, the color filter 50 and a driver circuit assembly (not shown) in combination construct an LCD module 70. The backlight module 10, the first polarizer 20, the TFT array substrate 30, the liquid crystal layer 40, the color filter 50 and the second polarizer 60 each have a substantially rectangular cross section.

The backlight module 10 can include LEDs (light emitting diodes) or CCFLs (cold cathode fluorescent lamps) as a light source for generating white light radiating upwardly through the first polarizer 20, the TFT array substrate 30, the liquid crystal layer 40, the color filter 50 and finally the second polarizer 60. The first polarizer 20 polarizes the light, which means that only the orthogonal direction of light is allowed to pass through the first polarizer 20 to reach the TFT array substrate 30. The liquid crystal layer 40 includes a plurality of liquid crystals therein. An direction of arrangement of the liquid crystals can be changed in accordance with a change of a bias across the liquid crystal layer 40, thereby to adjust amount of light through the liquid crystal layer 40. The color filter 50 in accordance with the present disclosure is an RGBW color filter and has a plurality of pixels each including a green sub-pixel, a red sub-pixel, a blue sub-pixel and a white sub-pixel. The white sub-pixels are transparent whereby a transmittance of the color filter 50 can be increased, in comparison with the RGB color filter, whereby the power needed by the backlight module 10 can be decreased. The function of the second polarizer 60, similar to the first polarizer 20, is used to allow only the orthogonal direction of light to pass therethrough.

Figure 2:
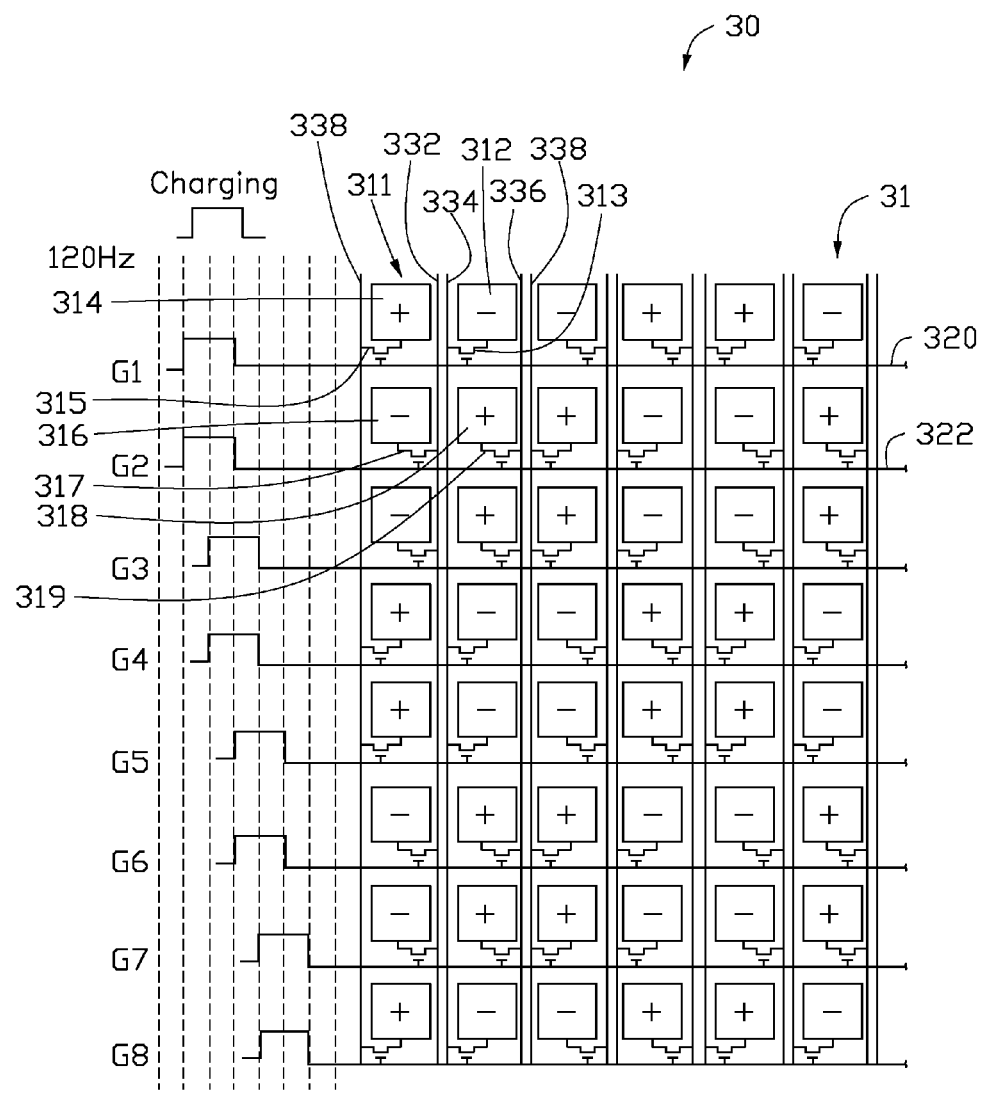
FIG. 2 is a diagram of a TFT array substrate of the RGBW TFT LCD in accordance with a first embodiment of the present disclosure.

Referring to FIG. 2, a circuit 31 of the TFT array substrate 30 of the RGBW TFT LCD 1 in accordance with a first embodiment of the present disclosure is shown. The circuit 31 is arranged in a manner that it is driven by column inversion and includes a plurality of pixels 311 arranged in a matrix. Although FIG. 2 shows that the pixels are arrange in three columns and four rows, it can be understood that the actual matrix number of the pixels 311 is far larger than 3×4, which can be, for example, 1920×1080 for a display of 5.5 inch. Each pixel 311 consists of a red sub-pixel 312, a green sub-pixel 314, a blue sub-pixel 316 and a white sub-pixel 318. The four sub-pixels 312, 314, 316, 318 are arranged in a substantially square matrix (i.e., 2×2 matrix) with the red and green sub-pixels 312, 314 arranged in a same row and the blue and white sub-pixels 316, 318 arranged in a neighboring same row, while the red and white sub-pixels 312, 318 arranged in a same column and the green and blue sub-pixels 314, 316 arranged in a neighboring same column. In their respective same row, the red and green sub-pixels 312, 314 are alternated, and the blue and white sub-pixels 316, 318 are alternated. In their respective same column, the red and white sub-pixels 312, 318 are alternated, and the green and blue sub-pixels 314, 316 are alternated.

Along the column direction (horizontal direction), two data lines 332, 334 are located between every two adjacent columns of the sub-pixels 312, 314, 316, 318 of a respective column of the pixels 311 and two other data lines 336, 338 are located between every two adjacent columns of the pixels 311. A first scan line 320 is located between every two adjacent rows of the sub-pixels 312, 314, 316, 318 of a respective row of the pixel 311. A second scan line 322 is located between every two adjacent rows of the pixels 311. The first and second scan lines 320, 322 are orthogonal to and intersecting with the data lines 332, 334, 336, 338. The data lines 332, 334, 336, 338 and the scan lines 320, 322 are electrically coupled to the sub-pixels 312, 314, 316, 318.

The red sub-pixel 312 of a first pixel 311, i.e., the pixel at a leftmost and topmost corner of the circuit 31 is electrically connected with the first scan line 320 immediately therebelow and the data line 334 adjacent thereto by a thin film transistor 313. The thin film transistor 313 has a source electrode (not labeled) in electrical coupling with the data line 334, a gate electrode (not labeled) in electrical coupling with the first scan line 320 and a drain electrode (not labeled) in electrical coupling with a pixel electrode (not labeled) of the red sub-pixel 312. The red sub-pixel 312 of a second pixel neighboring the first pixel and in the same row therewith is electrically connected with the first scan line 320 immediately therebelow and the data line 336 adjacent thereto by a corresponding thin film transistor. Then the red sub-pixels of the other pixels in the same row sequentially repeat the electrical connections of the red sub-pixels of the first and second pixels with the first scan line 320 and the data lines 334, 336, respectively. The red sub-pixel 312 of a third pixel neighboring the first pixel and in the same column therewith is electrically connected with the first scan line 320 immediately therebelow and the data line 336 adjacent thereto by a corresponding thin film transistor. Then the red sub-pixels of the other pixels in the same column sequentially repeat the electrical connections of the red sub-pixels of the first and third pixels with the first scan lines 320 and the data lines 334, 336, respectively.

The green sub-pixel 314 of the first pixel 311 is electrically connected with the first scan line 320 immediately therebelow and the data line 338 adjacent thereto by a thin film transistor 315. The thin film transistor 315 has a source electrode (not labeled) in electrical coupling with the data line 338, a gate electrode (not labeled) in electrical coupling with the first scan line 320 and a drain electrode (not labeled) in electrical coupling with a pixel electrode (not labeled) of the green sub-pixel 314. The green sub-pixel 314 of the second pixel neighboring the first pixel and in the same row therewith is electrically connected with the first scan line 320 immediately therebelow and the data line 332 adjacent thereto by a corresponding thin film transistor. Then the green sub-pixels of the other pixels in the same row sequentially repeat the electrical connections of the green sub-pixels of the first and second pixels with the first scan line 320 and the data lines 338, 332, respectively. The green sub-pixel 314 of the third pixel neighboring the first pixel and in the same column therewith is electrically connected with the first scan line 320 immediately therebelow and the data line 332 adjacent thereto by a corresponding thin film transistor. Then the green sub-pixels of the other pixels in the same column sequentially repeat the electrical connections of the green sub-pixels of the first and third pixels with the first scan lines 320 and the data lines 338, 332, respectively.

The blue sub-pixel 316 of the first pixel 311 is electrically connected with the second scan line 322 immediately therebelow and the data lines 332 adjacent thereto by a thin film transistor 317. The thin film transistor 317 has a source electrode (not labeled) in electrical coupling with the data line 332, a gate electrode (not labeled) in electrical coupling with the second scan line 322 and a drain electrode (not labeled) in electrical coupling with a pixel electrode (not labeled) of the blue sub-pixel 316. The blue sub-pixel 316 of the second pixel neighboring the first pixel and in the same row therewith is electrically connected with the second scan line 322 immediately therebelow and the data line 338 adjacent thereto by a corresponding thin film transistor. Then the blue sub-pixels of the other pixels in the same row sequentially repeat the electrical connections of the blue sub-pixels of the first and second pixels with the second scan line 322 and the data lines 332, 338, respectively. The blue sub-pixel 316 of the third pixel neighboring the first pixel and in the same column therewith is electrically connected with the second scan line 322 immediately therebelow and the data line 338 adjacent thereto by a corresponding thin film transistor. Then the blue sub-pixels of the other pixels in the same column sequentially repeat the electrical connections of the blue sub-pixels of the first and third pixels with the second scan lines 322 and the data lines 332, 338, respectively.

The white sub-pixel 318 of the first pixel 311 is electrically connected with the second scan line 322 immediately therebelow and the data line 336 adjacent thereto by a thin film transistor 319. The thin film transistor 319 has a source electrode (not labeled) in electrical coupling with the data line 336, a gate electrode (not labeled) in electrical coupling with the second scan line 322 and a drain electrode (not labeled) in electrical coupling with a pixel electrode (not labeled) of the white sub-pixel 318. The white sub-pixel 318 of the second pixel neighboring the first pixel and in the same row therewith is electrically connected with the second scan line 322 immediately therebelow and the data line 334 adjacent thereto by a corresponding thin film transistor. Then the white sub-pixels of the other pixels in the same row sequentially repeat the electrical connections of the white sub-pixels of the first and second pixels with the second scan line 322 and the data lines 336, 334, respectively. The white sub-pixel of the third pixel neighboring the first pixel and in the same column therewith is electrically connected with the second scan line 322 immediately therebelow and the data line 334 adjacent thereto by a corresponding thin film transistor. Then the white sub-pixels of the other pixels in the same column sequentially repeat the electrical connections of the white sub-pixels of the first and third pixels with the second scan lines 322 and the data lines 336, 334, respectively. Since in this embodiment, the sub-pixels are driven by column inversion, along each of the data lines 332, 334, 336, 338 the sub-pixels in electrical connection therewith have the same polarity.

Figure 3:
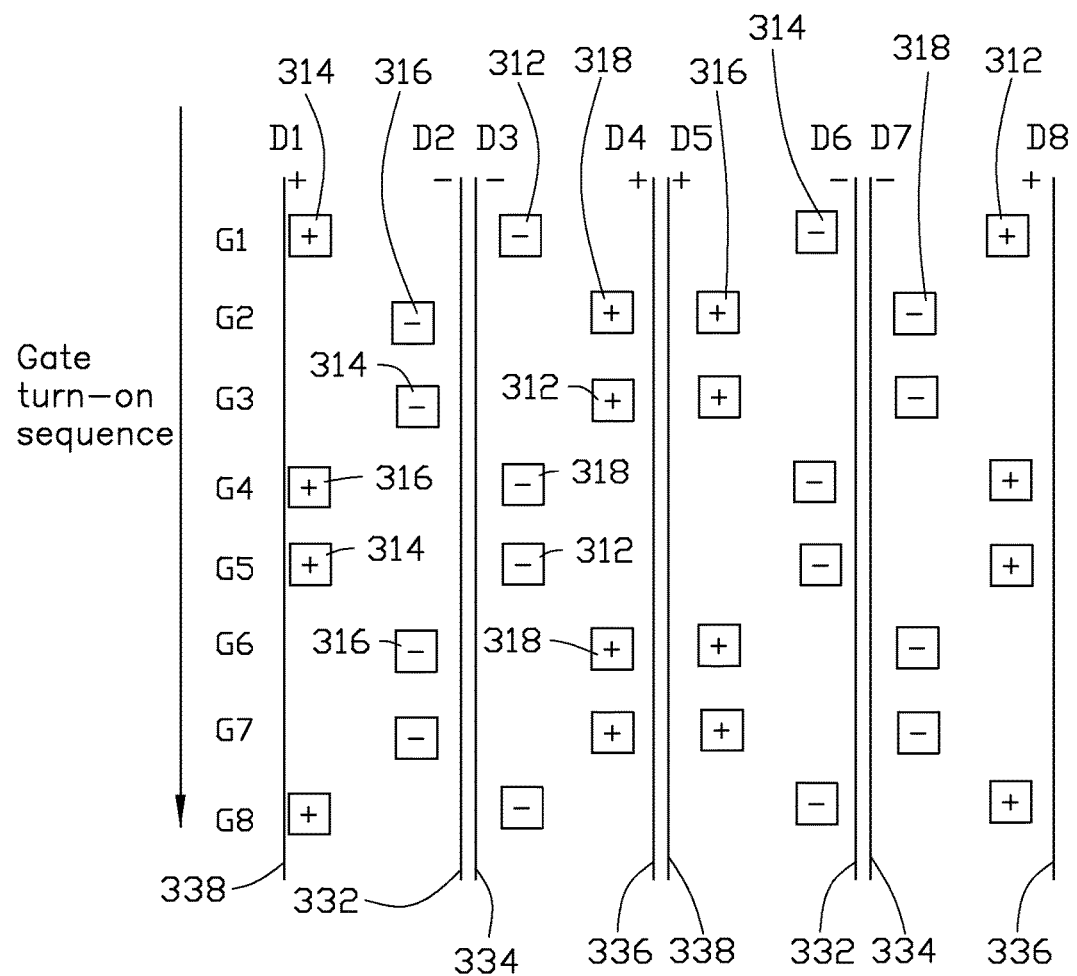
FIG. 3 is a diagram showing a control sequence of scan lines of the TFT array substrate of FIG. 2.

In operation, in the frame shown in FIG. 3, the data lines 332, 334 and the data lines 336, 338 are alternately supplied with positive voltage (for the data lines 336, 338) and negative voltage (for the data lines 332, 334), whereby the red (green, blue, white) sub-pixel 312 (314, 316, 318) and a neighboring red (green, blue, white) sub-pixel in either the same row or the same column have opposite polarities. The first and second scan lines 320, 322 are successively turned on along a top to bottom direction, wherein each time two respective first and second scan lines 320, 322 are turned on. In other words, the gates G1, G2 of the thin film transistors in connection with the upmost first and second scan lines 320, 322 are firstly turned on; then the gates G3 G4 are turned on, and so on. Accordingly when the RGBW TFT LCD 1 is required to show a single color of one of the red, green, blue and white colors, the pixels 311 in two neighboring columns or two neighboring rows have opposite polarities, i.e., one being positive and the other being negative. By such arrangement, the coupling effects caused by capacitors (Cscs, not shown) of each two neighboring columns of the pixels 311 on the waveform of a common electrode (Com, not shown) can offset from each other to obviate the horizontal crosstalk, wherein the capacitor (Csc) is a capacitor interconnecting a corresponding data line and the common electrode (Com) for supplying a bias across the liquid crystal layer 40. The common electrode (Com) and the capacitors (Cscs) are well known by those skilled in the art; detailed descriptions thereof are omitted here.

Figure 4:
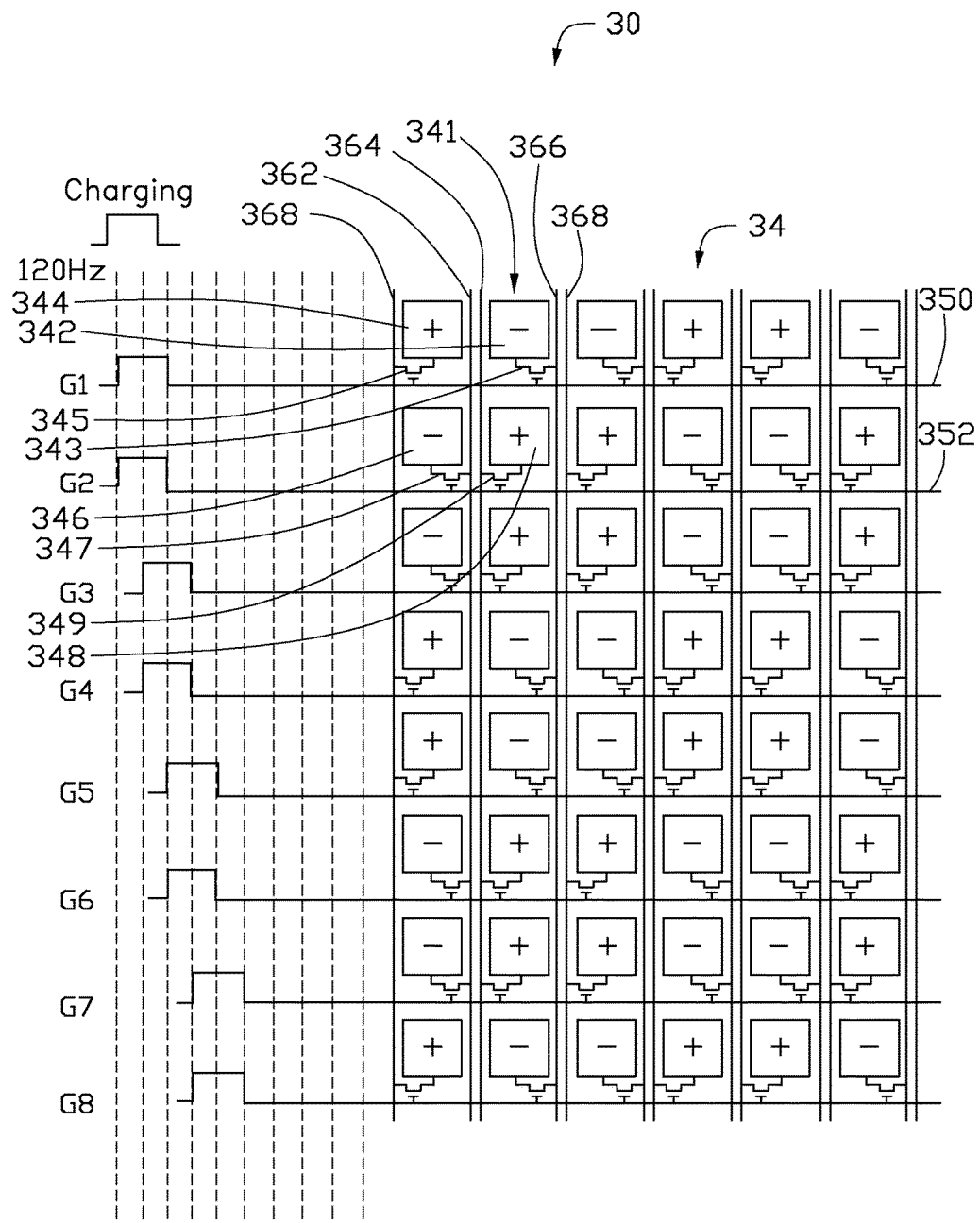
FIG. 4 is a diagram of a TFT array substrate of the RGBW TFT LCD in accordance with a second embodiment of the present disclosure.

Referring to FIG. 4, a circuit 34 of the TFT array substrate 30 of the RGBW TFT LCD 1 in accordance with a second embodiment of the present disclosure is shown. The circuit 34 is arranged in a manner that it is driven by column inversion and includes a plurality of pixels 341 arranged in a matrix. Although FIG. 4 shows that the pixels 341 are arrange in three columns and four rows, it can be understood that the actual matrix number of the pixels 341 is far larger than 3×4, which can be, for example, 1920×1080 for a display of 5.5 inch. Each pixel 341 consists of a red sub-pixel 342, a green sub-pixel 344, a blue sub-pixel 346 and a white sub-pixel 348. The four sub-pixels 342, 344, 346, 348 are arranged in a substantially square matrix (i.e., 2×2 matrix) with the red and green sub-pixels 342, 344 arranged in a same row and the blue and white sub-pixels 346, 348 arranged in a neighboring same row, while the red and white sub-pixels 342, 348 arranged in a same column and the green and blue sub-pixels 344, 346 arranged in a neighboring same column. In their respective same row, the red and green sub-pixels 342, 344 are alternated, and the blue and white sub-pixels 346, 348 are alternated. In their respective same column, the red and white sub-pixels 342, 348 are alternated, and the green and blue sub-pixels 344, 346 are alternated.

Along the column direction (horizontal direction), two data lines 362, 364 are located between every two adjacent columns of the sub-pixels 342, 344, 346, 348 of a respective column of the pixels 341 and two other data lines 366, 368 are located between every two adjacent columns of the pixels 341. A first scan line 350 is located between every two adjacent rows of the sub-pixels 342, 344, 346, 348 of a respective row of the pixels 341. A second scan line 352 is located between every two adjacent rows of the pixels 341. The first and second scan lines 350, 352 are orthogonal to and intersecting with the data lines 362, 364, 366, 368. The data lines 362, 364, 366, 368 and the scan lines 350, 352 are electrically coupled to the sub-pixels 342, 344, 346, 348.

The red sub-pixel 342 of a first pixel 341, i.e., the pixel at a leftmost and topmost corner of the circuit 34 is electrically connected with the first scan line 350 immediately therebelow and the data line 366 adjacent thereto by a thin film transistor 343. The thin film transistor 343 has a source electrode (not labeled) in electrical coupling with the data line 366, a gate electrode (not labeled) in electrical coupling with the first scan line 350 and a drain electrode (not labeled) in electrical coupling with a pixel electrode (not labeled) of the red sub-pixel 342. The red sub-pixel 342 of a second pixel neighboring the first pixel and in the same row therewith is electrically connected with the first scan line 350 immediately therebelow and the data line 364 adjacent thereto by a corresponding thin film transistor. Then the red sub-pixels of the other pixels in the same row sequentially repeat the electrical connections of the red sub-pixels of the first and second pixels with the first scan line 350 and the data lines 366, 364, respectively. The red sub-pixel of a third pixel neighboring the first pixel and in the same column therewith is electrically connected with the first scan line 350 immediately therebelow and the data line 364 adjacent thereto by a corresponding thin film transistor. Then the red sub-pixels of the other pixels in the same column sequentially repeat the electrical connections of the red sub-pixels of the first and third pixels with the first scan line 350 and the data lines 366, 364, respectively.

The green sub-pixel 344 of the first pixel 341 is electrically connected with the first scan line 350 immediately therebelow and the data line 368 adjacent thereto by a thin film transistor 345. The thin film transistor 345 has a source electrode (not labeled) in electrical coupling with the data line 368, a gate electrode (not labeled) in electrical coupling with the first scan line 350 and a drain electrode (not labeled) in electrical coupling with a pixel electrode (not labeled) of the green sub-pixel 344. The green sub-pixel 344 of the second pixel neighboring the first pixel and in the same row therewith is electrically connected with the first scan line 350 immediately therebelow and the data line 362 adjacent thereto by a corresponding thin film transistor. Then the green sub-pixels of the other pixels in the same row sequentially repeat the electrical connections of the green sub-pixels of the first and second pixels with the first scan line 350 and the data lines 368, 362, respectively. The green sub-pixel of the third pixel neighboring the first pixel and in the same column therewith is electrically connected with the first scan line 350 immediately therebelow and the data line 362 adjacent thereto by a corresponding thin film transistor. Then the green sub-pixels of the other pixels in the same column sequentially repeat the electrical connections of the green sub-pixels of the first and third pixels with the first scan line 350 and the data lines 368, 362, respectively.

The blue sub-pixel 346 of the first pixel 341 is electrically connected with the second scan line 352 immediately therebelow and the data lines 362 adjacent thereto by a thin film transistor 347. The thin film transistor 347 has a source electrode (not labeled) in electrical coupling with the data line 362, a gate electrode (not labeled) in electrical coupling with the second scan line 352 and a drain electrode (not labeled) in electrical coupling with a pixel electrode (not labeled) of the blue sub-pixel 346. The blue sub-pixel of the second pixel neighboring the first pixel and in the same row therewith is electrically connected with the second scan line 352 immediately therebelow and the data line 368 adjacent thereto by a corresponding thin film transistor. Then the blue sub-pixels of the other pixels in the same row sequentially repeat the electrical connections of the blue sub-pixels of the first and second pixels with the second scan line 352 and the data lines 362, 368, respectively. The blue sub-pixel of the third pixel neighboring the first pixel and in the same column therewith is electrically connected with the second scan line 352 immediately therebelow and the data line 368 adjacent thereto by a corresponding thin film transistor. Then the blue sub-pixels of the other pixels in the same column sequentially repeat the electrical connections of the blue sub-pixels of the first and third pixels with the second scan line 352 and the data lines 362, 368, respectively.

The white sub-pixel 348 of the first pixel 341 is electrically connected with the second scan line 352 immediately therebelow and the data line 364 adjacent thereto by a thin film transistor 349. The thin film transistor 349 has a source electrode (not labeled) in electrical coupling with the data line 364, a gate electrode (not labeled) in electrical coupling with the second scan line 352 and a drain electrode (not labeled) in electrical coupling with a pixel electrode (not labeled) of the white sub-pixel 348. The white sub-pixel of the second pixel neighboring the first pixel and in the same row therewith is electrically connected with the second scan line 352 immediately therebelow and the data line 366 adjacent thereto by a corresponding thin film transistor. Then the white sub-pixels of the other pixels in the same row sequentially repeat the electrical connections of the white sub-pixels of the first and second pixels with the second scan line 352 and the data lines 364, 366, respectively. The white sub-pixel of the third pixel neighboring the first pixel and in the same column therewith is electrically connected with the second scan line 352 immediately therebelow and the data line 366 adjacent thereto by a corresponding thin film transistor. Then the white sub-pixels of the other pixels in the same column sequentially repeat the electrical connections of the white sub-pixels of the first and third pixels with the second scan line 352 and the data lines 364, 366, respectively. Since in this embodiment, the sub-pixels are driven by column inversion, along each of the data lines 362, 364, 366, 368 the sub-pixels in electrical connection therewith have the same polarity.

Figure 5:
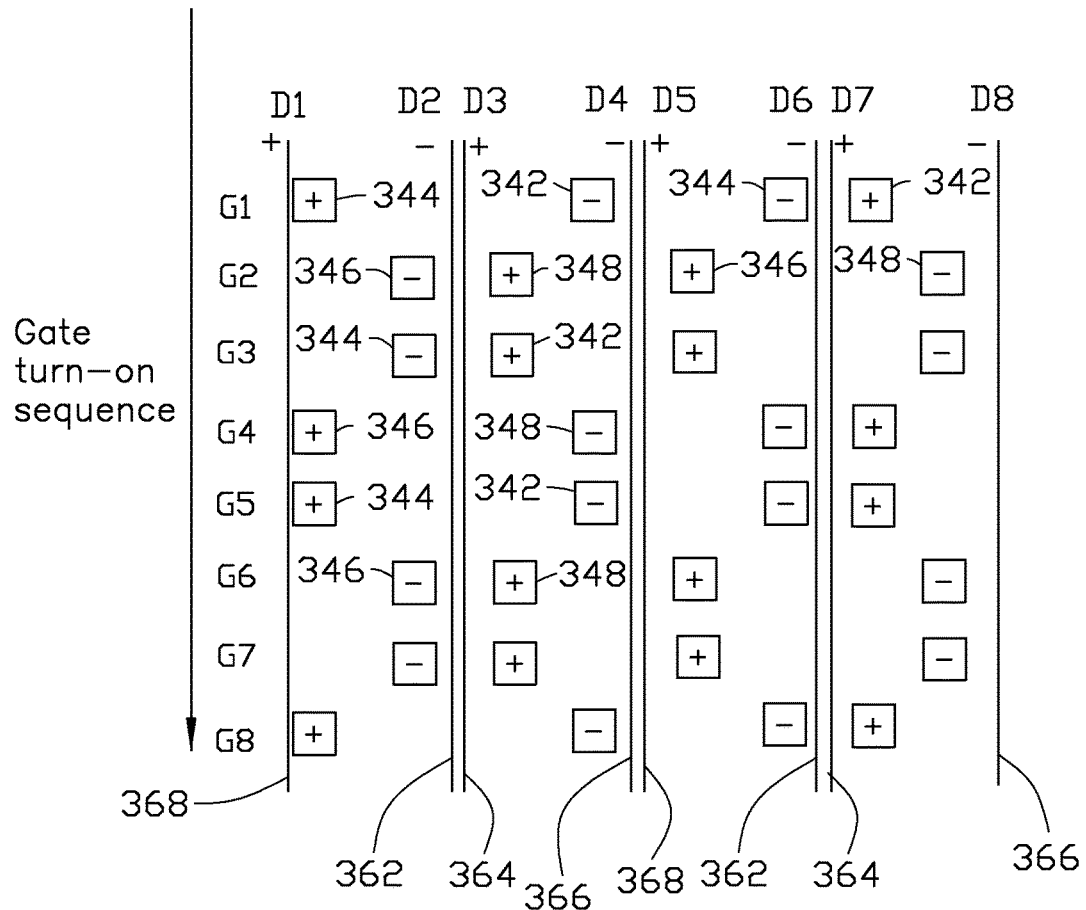
FIG. 5 is a diagram showing a control sequence of scan lines of the TFT array substrate of FIG. 4.

In operation, in the frame shown in FIG. 5, the data lines 362, 364, 366, 368 are alternately supplied with positive voltage (for data lines 364, 368) and negative voltage (for data lines 362, 366), whereby the red (green, blue, white) sub-pixel 342 (344, 346, 348) and a neighboring red (green, blue, white) sub-pixel in either the same row or the same column have opposite polarities. The first and second scan lines 350, 352 are successively turned on along a top to bottom direction, wherein each time two respective first and second scan lines 350, 352 are turned on. In other words, the gates G1, G2 of the thin film transistors in connection with the upmost first and second scan lines 350, 352 are firstly turned on; then the gates G3, G4 are turned on, and so on. Accordingly when the RGBW TFT LCD 1 is required to show a single color of one of the red, green, blue and white colors, the pixels 341 in two neighboring columns or two neighboring rows have opposite polarities, i.e., one being positive and the other being negative. By such arrangement, the coupling effects caused by capacitors (Cscs, not shown) of each two neighboring columns of the pixels 311 on the waveform of a common electrode (Com, not shown) can offset from each other to obviate the horizontal crosstalk, wherein the capacitor (Csc) is a capacitor interconnecting a corresponding data line and the common electrode (Com) for supplying a bias across the liquid crystal layer 40. The common electrode (Com) and the capacitors (Cscs) are well known by those skilled in the art; detailed descriptions thereof are omitted here.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in particular the matters of shape, size and arrangement of parts within the principles of the present disclosure, up to and including the full extent established by the broad general meaning of the terms used in the claims.

What is claimed is:

1. A TFT LCD (thin film transistor liquid crystal display) comprising:
   a TFT array substrate; and
   a liquid crystal layer located over the TFT array substrate;
   wherein the TFT array substrate comprises a plurality of pixels arranged in a matrix, each pixel comprising a red sub-pixel, a green sub-pixel, a blue sub-pixel and a white sub-pixel arranged in a 2×2 matrix;
   wherein two data lines are located between each two columns of the sub-pixels and a scan line is located between each two rows of the sub-pixels, each of the sub-pixels being electrically connected to a respective scan line immediately therebelow and a respective data line adjacent thereto, the scan lines in electrical connections with the pixels in different rows being successively turned on along a vertical direction; and
   wherein two neighboring same colored sub-pixels in a same row of the sub-pixels and two neighboring same colored sub-pixel in a same column of the sub-pixels respectively have opposite polarities when the TFT LCD is operated to output a screen having a color the same as the color of the two neighboring same colored sub-pixels.

2. The TFT LCD of claim 1, wherein the two date lines have a same polarity which is opposite to a polarity of two neighboring data lines.

3. The TFT LCD of claim 2, wherein the two data lines each are negatively charged while the neighboring two data lines each are positively charged and two further neighboring data lines each are also positively charged, and wherein the red sub-pixel is electrically connected to an adjacent one of the two further neighboring data lines, the green sub-pixel is electrically connected to an adjacent one of the two data lines, the blue sub-pixel is electrically connected to an adjacent one of the two neighboring data lines and the white pixel is electrically connected to an adjacent one of the two data lines.

4. The TFT LCD of claim 3, wherein the sub-pixels are electrically driven by column inversion whereby along a data line, the sub-pixels in electrical connection therewith have the same polarity.

5. The TFT LCD of claim 4 further comprising a color filter over the liquid crystal layer, wherein the color filter has a plurality of pixels each comprising a red sub-pixel, a green sub-pixel, a blue sub-pixel and a white sub-pixel which is transparent.

6. The TFT LCD of claim 5 further comprising a backlight module, wherein the TFT array substrate is located between the backlight module and the liquid crystal layer.

7. The TFT LCD of claim 1, wherein the data lines are alternately oppositely charged.

8. The TFT LCD of claim 7, wherein the red sub-pixel is electrically connected to an adjacent one of the two data lines, the green sub-pixel is electrically connected to an adjacent one of the two data lines, the blue sub-pixel is electrically connected to an adjacent one of two neighboring data lines and the white pixel is electrically connected to an adjacent one of two further neighboring data lines.

9. The TFT LCD of claim 8, wherein the sub-pixels are electrically driven by column inversion whereby along a data line, the sub-pixels in electrical connection therewith have the same polarity.

10. The TFT LCD of claim 9 further comprising a color filter over the liquid crystal layer, wherein the color filter has a plurality of pixels each comprising a red sub-pixel, a green sub-pixel, a blue sub-pixel and a white sub-pixel which is transparent.

11. The TFT LCD of claim 10 further comprising a backlight module, wherein the TFT array substrate is located between the backlight module and the liquid crystal layer.

12. A TFT array substrate for a display, comprising:
a plurality of pairs of data lines;
a plurality of scan lines intersecting with and orthogonal to the plurality of pairs of data lines;
a plurality of pixels arranged in a plurality of rows and columns, each pixel comprising a red sub-pixel, a green sub-pixel, a blue sub-pixel and a white sub-pixel wherein the red and green sub-pixels are arranged in a plurality of first rows, the blue and white sub-pixels are arranged in a plurality of second rows alternating with the first rows, the red and white sub-pixels are arranged in a plurality of first columns and the green and blue sub-pixels are arranged in a plurality of second columns alternating with the first columns;
wherein the red and green sub-pixels of a pixel are electrically to a common scan line immediately therebelow and two respective data lines adjacent thereto, and the blue and white sub-pixels of the pixel are electrically connected to another common scan line immediately therebelow and two other respective data lines adjacent thereto;
wherein the scan lines in electrical connections with the pixels in different rows are successively turned on along a vertical direction and the sub-pixels are electrically driven by column inversion whereby along a data line, the sub-pixels in electrical connection therewith have the same polarity; and
wherein two neighboring same colored sub-pixels in a same row of the sub-pixels have opposite polarities when the display is operated to output a screen having a color the same as the color of the two neighboring same colored sub-pixels.

13. The TFT array substrate of claim 12, wherein the each pair of data lines have a same polarity which is opposite to a polarity of each of two neighboring pairs of data lines.

14. The TFT array substrate of claim 13, wherein the red sub-pixel is electrically connected to an adjacent one of a corresponding neighboring pair of data lines, the green sub-pixel is electrically connected to an adjacent one of a corresponding pair of data lines, the blue sub-pixel is electrically connected to an adjacent one of another corresponding neighboring pair of data lines and the white pixel is electrically connected to an adjacent one of the corresponding pair of data lines.

15. The TFT array substrate of claim 12, wherein the data lines are alternately oppositely charged.

16. The TFT array substrate of claim 15, wherein the red sub-pixel is electrically connected to an adjacent one of a corresponding pair of data lines, the green sub-pixel is electrically connected to an adjacent one of the corresponding pair of data lines, the blue sub-pixel is electrically connected to an adjacent one of a corresponding neighboring pair of data lines and the white pixel is electrically connected to an adjacent one of another corresponding pair of data lines.

17. A thin film transistor liquid crystal display comprising:
a thin film transistor array substrate having a first surface and a second surface opposite to, and substantially parallel with, the first surface, the thin transistor film array comprises a plurality of pixels, a plurality of first data lines, a plurality of second data lines and a plurality of scan lines; and
a liquid crystal layer positioned on the first surface of the thin film transistor array substrate;
wherein, each of the plurality of pixels has a red sub-pixel, a green sub-pixel, a blue sub-pixel and a white sub-pixel with the red sub-pixel, the green sub-pixel, the blue sub-pixel and the white sub-pixel arranged in a 2 by 2 matrix forming multiple rows and columns of sub-pixels;
wherein, one of the plurality of first data lines and one of the plurality of second data lines is positioned on a first side and a second side of each column of the sub-pixels, with a first portion of the sub-pixels in each column electrically connected to the first data line on the first side of the column and a second portion of the sub-pixels in each column electrically connected to the second data line on the second side of the column;
wherein, one of the plurality of scan lines is located on a first side of each row of sub-pixels with each sub-pixel in each row being electrically connected to the scan line;
wherein, each of the plurality of scan lines are successively activated in a vertical direction; and
wherein, the sub-pixels are arranged such that same colored sub-pixels adjacent to each other in a row and same colored sub-pixels adjacent in a column have opposite polarization when the thin film transistor liquid crystal display is activated to output color of the adjacent same colored sub-pixels.

* * * * *